United States Patent [19]
Straus
[11] 3,818,237
[45] June 18, 1974

[54] MEANS FOR PROVIDING REDUNDANCY OF KEY SYSTEM COMPONENTS

[75] Inventor: Thomas M. Straus, Los Angeles, Calif.

[73] Assignee: Hughes Aircraft Company, Culver City, Calif.

[22] Filed: Aug. 14, 1972

[21] Appl. No.: 280,624

[52] U.S. Cl. .......................... 307/64, 307/18, 307/23
[51] Int. Cl. .......................................... H04m 19/02
[58] Field of Search ............. 307/18, 19, 23, 29, 64, 307/66, 44, 51, 70, 80

[56] References Cited

UNITED STATES PATENTS 3,601,551 8/1971 Weber .................................. 307/18

*Primary Examiner*—Herman J. Hohauser
*Attorney, Agent, or Firm*—Don O. Dennison; W. H. MacAllister, Jr.

[57] ABSTRACT

A system is disclosed for providing equipment redundancy where, in one embodiment, two substantially identical sources respectively supply substantially identical signals to two load circuits under normal operating conditions. In this embodiment, switching means is coupled to a 3 decibel hybrid and also to the sources and load circuits. When one of the sources fails, the switching means is utilized to operationally remove the defective source from its associated load circuit and to couple the remaining source to one input of the 3 decibel hybrid. Two outputs of the hybrid are respectively coupled through the switching means to the load circuits to then enable the load circuits to continue operating.

1 Claim, 3 Drawing Figures

MEANS FOR PROVIDING REDUNDANCY OF KEY SYSTEM COMPONENTS

BACKGROUND OF THE INVENTION

1. Field of the Invention

This invention relates to equipment redundancy systems and particularly to a system for utilizing one presently operating component as a back-up component for a like presently operating component.

2. Description of the Prior Art

Redundancy is normally provided in systems by duplicating existing equipment (full back-up) and having it operated on either "hot" or "cold" standby.

In "hot" standby the redundant equipment is completely turned on at all times but is not switched into operation in the system until the like primary equipment fails. The problem with "hot" standby, in addition to wasting a considerable amount of prime power, is that part of the useful life of the redundant equipment is being used up without any contribution to system operation.

In "cold" standby the redundant equipment is either just partially turned on or is completely turned off. In either case, the redundant equipment is not ready for immediate operation when the primary equipment fails. An example of partially turned on equipment is where only filament voltage is normally applied to the redundant equipment while it is in standby. In this case, it still takes time to turn on the equipment and make it operational. In the case where the redundant equipment is completely turned off in standby, it takes even longer to place it in full operation than where only the filament voltage was applied. Furthermore, equipment which has been on "cold standby" is more likely to fail during or shortly after turn on than equipment which has been operational during the full time.

In still other cases there may be no redundancy supplied at all, in which case a failure in the system can render the system inoperative until the trouble is isolated and repaired.

In present day systems using either hot or cold standby there is no known utilization of equipment operating in the system as back-up for like operating equipment.

It is therefore an object of this invention to provide a novel and economical means for providing redundancy in an operating system.

Another object of this invention is to provide redundancy of key system components with the use of a switching network which can allow continued system operation when a failure occurs, with only slightly degraded performance.

Another object of this invention is to protect an operating system against catastrophic failures by designing the system in such a way that equipment redundancy is provided if a failure occurs.

Another object of this invention is to normally utilize the redundant equipment as part of the normal operating equipment in the system.

Another object of this invention is to provide equipment redundancy which is not wasteful of power and component life.

A further object of this invention is to assure component redundancy by utilizing a 3 decibel hybrid device to apply signals to at least two load circuits.

SUMMARY OF THE INVENTION

Briefly, applicant has provided a novel mechanization for providing component redundancy in an operational system. In a preferred embodiment, switching means is coupled to a 3 decibel hybrid, to two similar sources, and to two respective load circuits for the sources. In the event that one of the sources fails, the switching means performs two functions. First, it operationally removes the defective source from its associated load circuit. Second, it couples the remaining source of the hybrid to enable the hybrid to divide the power from that source between the two load circuits to enable both load circuits to continue operating.

BRIEF DESCRIPTION OF THE DRAWINGS

These and other objects, features and advantages of the invention, as well as the invention itself, will become more apparent to those skilled in the art in the light of the following detailed description taken in consideration with the accompanying drawings wherein like reference numerals indicate like or corresponding parts throughout the several views and wherein.

DESCRIPTION OF THE PREFERRED EMBODIMENTS

Figure 1:
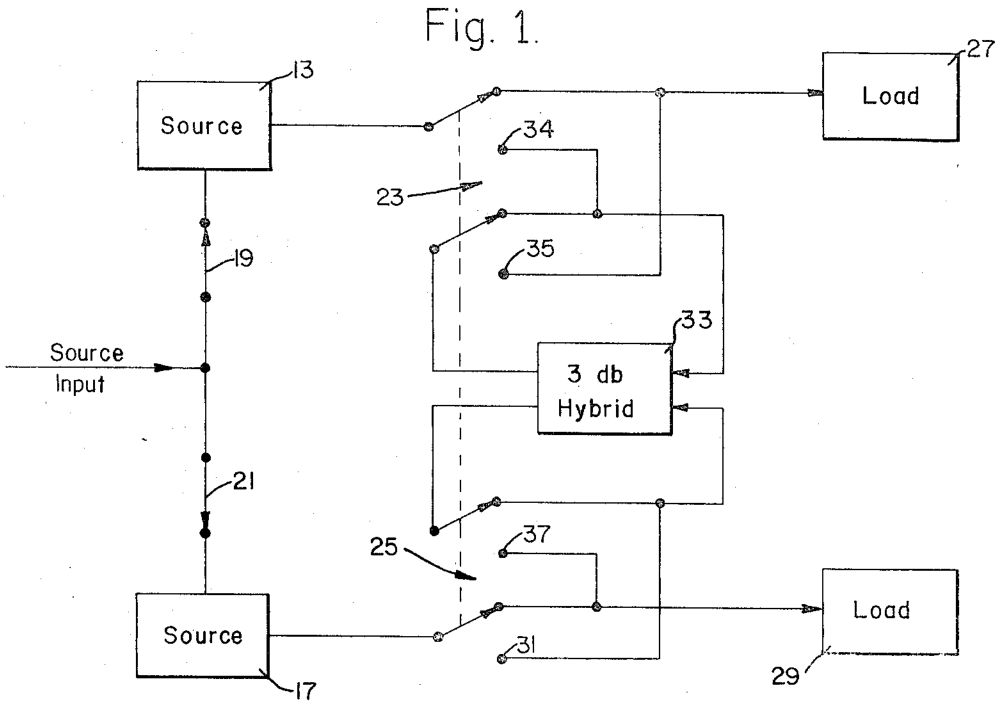
FIG. 1 illustrates a block diagram of one embodiment of the invention.

Referring now to the drawings, FIG. 1 discloses a first embodiment of the invention. Sources 13 and 17 are respectively enabled by the application of a source input through normally closed switches 19 and 21. The source input may be a signal input if the sources 13 and 17 are amplifiers, for example, or may be a power input if the sources 13 and 17 are oscillators, for example. When enabled, each of the sources 13 and 17 generates electromagnetic energy at substantially the same frequency and power level as those of the other source. Under normal operating conditions the electromagnetic energy outputs of the sources 13 and 17 are respectively applied through ganged, double-pole, double-throw switches 23 and 25 to loads 27 and 29, respectively.

In the event that one of the sources 13 and 17 becomes defective by, for example, exhibiting a poor frequency spectrum, a greatly reduced power output, or no decibel output, the redundancy of the sources 13 and 17 magic continued system operation. Assume that the source 13 fails. The switch 19 is opened to prevent the application of the source input to the source 13, thereby diabling the source 13 and operationally of it from the system. Also, the switches 23 and 25 are changed to the positions opposite from those shown in FIG. 1. The switches 19, 23 and 25 (as well as the switch 21) can be either applied or automatically two output a source operating failure occurs. The output of the source 17 is then applied through a contact 31 of the switch 25 into the lower input of a 3 dicibel (db) hybrid 33, which can be, for example, a magnic tee. Since the switch 23 has also been thrown to the opposite position from that shown, the source 13 is coupled through a contact 34 of the switch 23 to the upper input fo the hybrid 33. However, the source 13 was disabled by the opening of the switch 19. As a consequence, only the source 17 supplies electromagnetic energy to the hybrid 33. The hybrid 33 splits the input energy 9applied thereto into the utput portions, in a manner well-known in the art. One output portion is applied through a contact 35 of the switch 23 to the load 27, while the second portion is applied through a contact 37 of the switch 25 to the load 29. Each of the portions being applied to its associated load is at a power level 3 db below the power level at the output of the source 17. Thus, the redundancy of such normally operting components as the sources 13 and 17 protects the system against potentially catastrophic failures, with only slightly degraded performance. Of course, upon repair of the defective source normal system operation can be resumed when all of the switches 19, 21, 23 and 25 are positioned as shown in FIG. 1.

An exemplary practical application of the invention may be in a communications system and, more particularly, in a multichannel microwave communication system or a cable television system. At the transmitter end of such a system, a plurality of channelized upconverters (not shown) can be employed to convert input VHF television signals to a desired plurality of frequencies within a selected frequency band for subsequent transmission to subscribers. In this case, each of the sources 13 and 17 can be a phase-locked, klystron pump oscillator (not shown) and each of the loads 27 and 29 can be a power divider for dividing the output power from the klystron oscillator among a plurality of the upconverters. Thus, in the event one of the klystron oscillators failed, the output of the remaining klystron oscillator would be utilized via the switches 23 and 25, the hybrid 33 and the loads 27 and 29 to supply power to all of the upconverters in the system. This mechanization for providing redundancy for a key operating component, therefore, minimizes the loss of equipment shutdown due to the failure of that key operating component.

Figure 2:
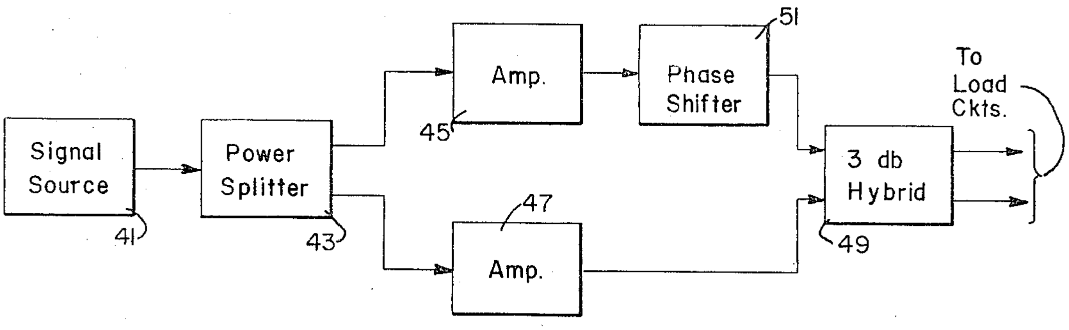
FIG. 2 illustrates a block diagram of a second embodiment of the invention.

A second embodiment of this invention is illustrated in FIG. 2. In this embodiment, the output signal from a signal source 41 is split into two portions by a power splitter 43 for subsequent amplification by amplifiers 45 and 47. The output of the amplifier 47 is applied directly to one input terminal of a three db hybrid 49, while the output of the amplifier 45 is shifted in phase by a phase shifter 51 before it is applied to a second input terminal of the hybrid 49. The hybrid 49 may be a magic tee which develops two output signals substantially equal in power when the signals applied to its input terminals have a preselected phase relationship with respect to each other. Each of these two output signals may then be utilized to supply signal power to associated circuits, in a manner similar to that discussed in relation to FIG. 1. It should be noted that the phase shifter 51 could be incorporated into the hybrid 49 to form one integral unit.

The redundant operating components in this second embodiment of FIG. 2 are illustrated to be the amplifiers 45 and 47. It should be apparent, however, that these amplifiers are utilized here for illustrative purposes only, and that the use of other redundant components in the system falls within the scope of the invention.

If either of the amplifiers 45 and 47 fails, the hybrid 49 will still develop two substantially equal power outputs, but at power levels approximately 3 db down from normal operation. The embodiment of FIG. 2, like that of FIG. 1, allows continued operation of the system even though one of the key components, the amplifier 45 or 47, fails in operation. The redundancy in the embodiment of FIG. 2 is therefore mechanized to eliminate the switching circuitry of FIG. 1.

Figure 3:
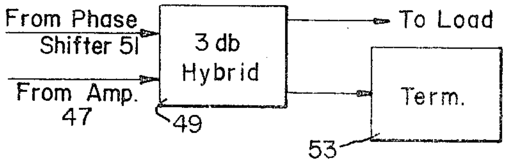
FIG. 3 illustrates a modification of the embodiment of FIG. 2 to provide a third embodiment of the invention.

The embodiment of FIG. 2 is modified in FIG. 3 to provide a third embodiment of the invention. The phase shifter 51 (FIG. 2) is adjusted to control the phase relationship between the inputs to the hybrid 49 from the amplifiers 45 and 47 (FIG. 2) so that all of the signal power comes out of the first output terminal of the hybrid 49. This output signal power is then utilized by only one load circuit (not shown). A termination 53 is coupled to the second output terminal of the hybrid 49.

In the event that one of the amplifiers 45 and 47 (FIG. 2) fails, the input power to the hybrid 49 decreases by up to 3 db. As discussed previously in relationship to the embodiment of FIG. 2, the hybrid produces two outputs equal in power when only one input is applied thereto. As a result, the signal power being applied from the first output terminal of the hybrid to its load circuit decreases by up to 6 db. The signal power appearing at the second output terminal of the hybrid 49 is dissipated by the termination 53 to prevent reflections back into the hybrid 49. Thus, with a failure of one of the amplifiers 45 and 47, the load can continue to receive some power from the remaining operative amplifier even though it is at a reduced power level.

It should be noted at this time that the operating redundant mechanizations of each of the embodiments of FIGS. 1, 2 and 3 can be of particular economic advantage when the system design is limited by component state of the art which precludes the use of a single key component to achieve the normally required performance levels. In this event the key component must be duplicated. It is also a tremendous economic advantage over providing full redundancy, as is done in the prior art, by maintaining a spare component in each equipment rack to throw into system operation upon the failure of a corresponding key operating component. Furthermore, it is a very important operational improvement over having half the channels in a system inoperative for the period of time required to either repair the system or to insert and stabilize the operation of the spare component in the system.

The invention thus provides a system for providing equipment redundancy whenever two substantially similar, key operating components are used in a system for supplying signals at substantially the same operating frequencies to at least one load circuit. With the failure of one of the key operating components, in one embodiment, the output of the remaining key operating component is split into two signal portions by a three decibel hybrid, with each signal portion being applied to an associated load circuit to allow that associated load circuit to continue to operate in spite of the failure of one of the key operating components.

While the salient features have been illustrated and described with respect to three embodiments, it should be readily apparent to those skilled in the art that modifications, other than those indicated above, can be made within the spirit and scope of the invention as set forth in the appended claims.

What is claimed is:

1. A system comprising:

first and second means for respectively developing first and second signals;

first and second load circuits;

a three db hybrid for producing third and fourth signals of substantially equal power levels in response to either of said first and second signals; and dual mode switching means coupled to said first and second means, said first and second load circuits and said 3 db hybrid, said switching means applying the first and second signals to said first and second load circuits, respectively, in a first mode of operation, said switching means applying only a selected one of the first and second signals to said 3 db hybrid and applying the third and fourth signals to said first and second load circuits, respectively, in a second mode of operation.

* * * * *

PO-1050
(5/69)

UNITED STATES PATENT OFFICE
CERTIFICATE OF CORRECTION

Patent No. 3,818,237 Dated June 18, 1974

Inventor(s) THOMAS M. STRAUS

It is certified that error appears in the above-identified patent and that said Letters Patent are hereby corrected as shown below:

| | |
|---|---|
| Column 2, line 52 | change "no decibel output" to --no power output--. |
| Column 2, line 53 | change "magic" to --allows--. |
| Column 2, line 56 | change diabling" to --disabling--. |
| Column 2, line 56 | change "of it" to --removing it--. |
| Column 2, line 60 | change "applied" to --manually--. |
| Column 2, lines 60-61 | change "two output a source operating failure occurs" to --operated when a source failure occurs--. |
| Column 2, line 64 | change "magnic" to --magic--. |
| Column 3, line 5 | change "utput" to --output--. |
| Column 3, line 5, | change "the" to -- two -- . |

Signed and sealed this 29th day of October 1974.

(SEAL)
Attest:

McCOY M. GIBSON JR.
Attesting Officer

C. MARSHALL DANN
Commissioner of Patents